United States Patent
Geen

(10) Patent No.: US 7,032,451 B2
(45) Date of Patent: Apr. 25, 2006

(54) MICROMACHINED SENSOR WITH QUADRATURE SUPPRESSION

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/065,878

(22) Filed: Feb. 25, 2005

(65) Prior Publication Data
US 2005/0139005 A1 Jun. 30, 2005

Related U.S. Application Data

(62) Division of application No. 10/360,987, filed on Feb. 6, 2003, now Pat. No. 6,877,374.

(60) Provisional application No. 60/354,610, filed on Feb. 6, 2002, provisional application No. 60/364,322, filed on Mar. 14, 2002.

(51) Int. Cl.
*G01P 9/04* (2006.01)
(52) U.S. Cl. .................................. 73/504.14
(58) Field of Classification Search ............. 73/504.14, 73/504.01, 504.04, 504.02, 504.12, 504.16, 73/514.32, 514.16, 514.29, 514.36
See application file for complete search history.

(56) References Cited

U.S. PATENT DOCUMENTS

| | | | |
|---|---|---|---|
| 2,309,853 A | 2/1943 | Lyman et al. | |
| 4,381,672 A | 5/1983 | O'Connor et al. | 73/505 |
| 4,510,802 A | 4/1985 | Peters | 73/505 |
| 4,524,619 A | 6/1985 | Staudte | 73/505 |
| 4,598,585 A | 7/1986 | Boxenhorn | 73/505 |
| 4,654,663 A | 3/1987 | Alsenz et al. | 73/517 |
| 4,744,248 A | 5/1988 | Stewart | 73/505 |
| 4,744,249 A | 5/1988 | Stewart | 73/505 |
| 4,884,446 A | 12/1989 | Ljung | 73/505 |
| 5,016,072 A | 5/1991 | Greiff | 357/26 |
| 5,016,076 A | 5/1991 | Darwish | 357/38 |
| 5,025,346 A | 6/1991 | Tang et al. | 361/283 |
| 5,056,366 A | 10/1991 | Fersht et al. | 73/505 |
| 5,111,693 A | 5/1992 | Greiff | 73/514 |
| 5,144,184 A | 9/1992 | Greiff | 310/312 |
| 5,195,371 A | 3/1993 | Greiff | 73/505 |

(Continued)

FOREIGN PATENT DOCUMENTS

WO         WO 93/05401         3/1993

(Continued)

OTHER PUBLICATIONS

Weeinberg et al. *A Micromachined Comb-Drive Tuning Fork Rate Gyroscope*, Proceedings of the 49th Annual Meeting of the Institute of Navigation, Jun. 21-23, 1993, 7 pages.

(Continued)

*Primary Examiner*—Helen Kwok
(74) *Attorney, Agent, or Firm*—Bromberg & Sunstein LLP

(57) ABSTRACT

Quadrature suppression is provided by placing a resonator mass adjacent to a quadrature suppression electrode. The resonator mass is capable of moving substantially parallel to the quadrature suppression electrode and includes a notch formed adjacent to a portion of the quadrature suppression electrode such that a length of resonator mass that is directly adjacent to the quadrature suppression electrode varies as the resonator mass moves relative to the quadrature suppression electrode. The quadrature suppression electrode is capable of producing a lateral force on the resonator mass that varies based on the length of resonator mass that is directly adjacent to the quadrature suppression electrode. Such quadrature suppression can be used in sensors having one or more resonator masses.

22 Claims, 14 Drawing Sheets

U.S. PATENT DOCUMENTS

| | | | | |
|---|---|---|---|---|
| 5,203,208 A | 4/1993 | Bernstein | | 73/505 |
| 5,216,490 A | 6/1993 | Greiff et al. | | 73/517 |
| 5,241,861 A | 9/1993 | Hulsing, II | | 73/505 |
| 5,259,247 A | 11/1993 | Bantien | | 73/718 |
| 5,273,939 A | 12/1993 | Becker et al. | | 437/209 |
| 5,313,835 A | 5/1994 | Dunn | | 73/505 |
| 5,329,815 A | 7/1994 | Dunn et al. | | 73/505 |
| 5,341,682 A | 8/1994 | Hulsing, II | | 73/505 |
| 5,343,749 A | 9/1994 | Macy | | 73/505 |
| 5,349,855 A | 9/1994 | Bernstein et al. | | 73/505 |
| 5,359,893 A | 11/1994 | Dunn | | 73/505 |
| 5,367,217 A | 11/1994 | Norling | | 310/370 |
| 5,377,544 A | 1/1995 | Dunn | | 73/505 |
| 5,392,650 A | 2/1995 | O'Brien et al. | | 73/517 |
| 5,408,877 A | 4/1995 | Greiff et al. | | 73/505 |
| 5,481,914 A | 1/1996 | Ward | | 73/504.16 |
| 5,492,596 A | 2/1996 | Cho | | 156/632.1 |
| 5,496,436 A | 3/1996 | Bernstein et al. | | 156/628.1 |
| 5,505,084 A | 4/1996 | Greiff et al. | | 73/504.14 |
| 5,511,419 A | 4/1996 | Dunn | | 73/504.08 |
| 5,515,724 A | 5/1996 | Greiff et al. | | 73/504.12 |
| 5,530,342 A | 6/1996 | Murphy | | 324/158.1 |
| 5,535,902 A | 7/1996 | Greiff | | 215/2 |
| 5,537,872 A | 7/1996 | Frere et al. | | 73/504.12 |
| 5,555,765 A | 9/1996 | Greiff | | 73/504.09 |
| 5,574,222 A | 11/1996 | Offenberg | | 73/514.32 |
| 5,581,035 A | 12/1996 | Greiff | | 73/514.32 |
| 5,600,064 A | 2/1997 | Ward | | 73/504.04 |
| 5,600,065 A | 2/1997 | Kar et al. | | 73/504.12 |
| 5,604,309 A | 2/1997 | Ward | | 73/504.02 |
| 5,604,312 A | 2/1997 | Lutz | | 73/504.14 |
| 5,608,351 A | 3/1997 | Ward | | 330/107 |
| 5,635,638 A | 6/1997 | Geen | | 73/504.04 |
| 5,635,639 A | 6/1997 | Greiff et al. | | 73/504.04 |
| 5,635,640 A | 6/1997 | Geen | | 73/504.12 |
| 5,646,348 A | 7/1997 | Greiff et al. | | 73/514.36 |
| 5,650,568 A | 7/1997 | Greiff et al. | | 73/504.09 |
| 5,672,949 A | 9/1997 | Ward | | 318/609 |
| 5,696,323 A | 12/1997 | Hulsing, II | | 73/504.12 |
| 5,717,140 A | 2/1998 | Hulsing, II | | 73/504.16 |
| 5,734,105 A | 3/1998 | Mizukoshi | | 73/504.02 |
| 5,747,961 A | 5/1998 | Ward et al. | | 318/646 |
| 5,763,781 A | 6/1998 | Netzer | | 73/504.16 |
| 5,767,405 A | 6/1998 | Bernstein et al. | | 73/504.16 |
| 5,783,973 A | 7/1998 | Weinberg et al. | | 331/35 |
| 5,795,988 A | 8/1998 | Lo et al. | | 73/1.77 |
| 5,796,001 A | 8/1998 | Greiff et al. | | 73/504.16 |
| 5,869,760 A | 2/1999 | Geen | | 73/504.12 |
| 5,886,816 A | 3/1999 | Faris | | 359/464 |
| 5,892,153 A | 4/1999 | Weinberg et al. | | 73/504.16 |
| 5,895,850 A | 4/1999 | Buestgens | | 73/504.12 |
| 5,895,851 A | 4/1999 | Kano et al. | | 73/504.04 |
| 5,911,156 A | 6/1999 | Ward et al. | | 73/504.16 |
| 5,918,280 A | 6/1999 | Gang et al. | | 73/504.12 |
| 5,920,012 A | 7/1999 | Pinson | | 73/504.12 |
| 5,945,600 A | 8/1999 | Touge et al. | | 73/504.14 |
| 5,952,572 A | 9/1999 | Yamashita et al. | | 73/504.04 |
| 5,955,668 A | 9/1999 | Hsu et al. | | 73/504.12 |
| 5,987,986 A | 11/1999 | Wyse et al. | | 73/504.12 |
| 5,992,233 A | 11/1999 | Clark | | 73/514.35 |
| 6,009,751 A | 1/2000 | Ljung | | 73/504.02 |
| 6,032,531 A | 3/2000 | Roszhart | | 73/504.04 |
| 6,044,707 A | 4/2000 | Kato | | 73/504.14 |
| 6,064,169 A | 5/2000 | Ward et al. | | 318/646 |
| 6,067,858 A * | 5/2000 | Clark et al. | | 73/504.16 |
| 6,070,463 A | 6/2000 | Moriya et al. | | 73/504.12 |
| 6,070,464 A | 6/2000 | Koury, Jr. et al. | | 73/514.32 |
| 6,089,089 A | 7/2000 | Hsu | | 73/504.12 |
| 6,122,961 A * | 9/2000 | Geen et al. | | 73/504.12 |
| 6,128,953 A | 10/2000 | Mizukoshi | | 73/504.02 |
| 6,155,115 A | 12/2000 | Ljung | | 73/504.12 |
| 6,164,134 A | 12/2000 | Cargille | | 73/504.02 |
| 6,189,381 B1 | 2/2001 | Huang et al. | | 73/504.12 |
| 6,190,571 B1 | 2/2001 | Kato | | 215/2 |
| 6,230,563 B1 | 5/2001 | Clark et al. | | 73/504.04 |
| 6,250,156 B1 | 6/2001 | Seshia et al. | | 73/502.12 |
| 6,250,157 B1 | 6/2001 | Touge | | 73/504.12 |
| 6,257,059 B1 | 7/2001 | Weinberg et al. | | 73/504.16 |
| 6,282,960 B1 | 9/2001 | Samuels et al. | | 73/514.32 |
| 6,289,733 B1 | 9/2001 | Challoner et al. | | 73/504.12 |
| 6,311,555 B1 | 11/2001 | McCall et al. | | 73/488 |
| 6,321,598 B1 | 11/2001 | Iwaki et al. | | 73/504.02 |
| 6,505,511 B1 | 1/2003 | Geen et al. | | 73/504.12 |
| 6,516,666 B1 | 2/2003 | Li | | 73/504.12 |
| 6,561,029 B1 | 5/2003 | Folkmer et al. | | 73/504.14 |
| 6,767,758 B1 | 7/2004 | Geen | | 438/48 |
| 6,860,151 B1 | 3/2005 | Platt et al. | | 73/504.16 |
| 2003/0005767 A1 | 1/2003 | Hulsing, II | | 73/514.02 |
| 2003/0131664 A1 | 7/2003 | Mochida, et al. | | 73/504.12 |
| 2003/0131669 A1 | 7/2003 | Osawa | | 73/861.355 |

FOREIGN PATENT DOCUMENTS

| | | |
|---|---|---|
| WO | WO 96/39615 | 12/1996 |
| WO | WO 01/79862 A1 | 10/2001 |

OTHER PUBLICATIONS

Seshia et al. *Intergrated Microelectromechanical Resonant Output Gyroscope*, updated, online <http://hera.berkeley.edu/IRO/Summary/o 1 abstracts/ aseshia.1.html>, printed Feb. 6, 2002, 2 pages.

Geen et al. *Single-Chip Surface Micromachined Intergrated Gyroscope with 50 /h Allan Deviation*, IEEE Journal of Solid-State Circuits, vol. 37, No. 12, Dec. 2002, 7 pages.

*A Comb-drive Piezoresistive Vibratory Gyroscope*, online <http://mems.stanford.edu/ lian/gyro.html>, printed Feb. 6, 2002, 4 pages.

* cited by examiner

VELOCITY 2nd HARMONIC DISTORTION $cf := clp - \frac{an}{2} - \frac{3\,gg}{2}$     center line at velocity fingers to coupling lever pivot     $\frac{cf}{um} = 48.3$ $Nv := 0, 1 .. \frac{v}{8} - 1$     $s(Nv) := \frac{cf}{lcl - Nv\,(wf(0)+gv(0))\,2} \quad \frac{gg}{um}$

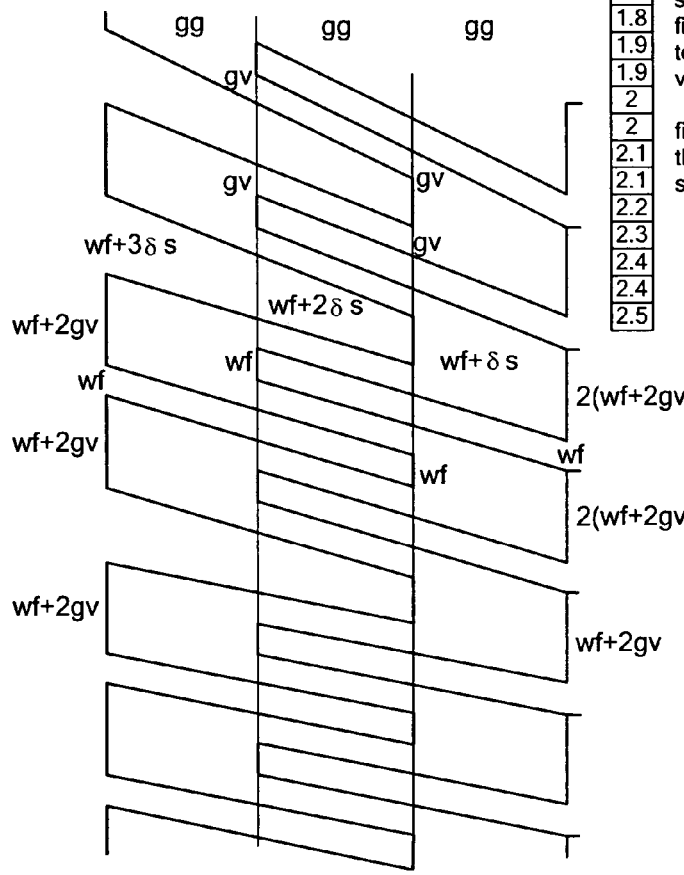

s(Nv)=

| 1.7 |
| 1.7 |
| 1.8 |
| 1.8 |
| 1.8 |
| 1.9 |
| 1.9 |
| 2   |
| 2   |
| 2.1 |
| 2.1 |
| 2.2 |
| 2.3 |
| 2.4 |
| 2.4 |
| 2.5 | gv>gd to allow perpendicular spacing within gd limit s is Y coordinate shift of finger for X of gg rounded to 0.1um. This allows the vertices of all fingers on grid.

fingers have uniform pitch on the coupling lever and uniform separation on the fixed bus.

$td(Nv) := (s(Nv) - round(s(Nv(Nv), 1))) \frac{lcl - Nv\,(wf(0)+gv(0))\,2}{cf}$ tangential displacement error, um, or effective value.

$tde := \sqrt{\sum_{Nv=0}^{\frac{v}{8}} \frac{8\,td(Nv)^2}{v}}$     $tde = 0.12$

MICROMACHINED SENSOR WITH QUADRATURE SUPPRESSION

PRIORITY

This application is a divisional of U.S. patent application Ser. No. 10/360,987 now U.S. Pat. No. 6,877,374 filed Feb. 6, 2003, currently allowed, which claims priority from U.S. Provisional Patent Application No. 60/354,610 filed Feb. 6, 2002 and U.S. Provisional Patent Application No. 60/364,322 filed Mar. 14, 2002. The above-referenced patent applications are hereby incorporated herein by reference in their entireties.

FIELD OF THE INVENTION

The present invention relates generally to micromachined sensors, and more particularly to micromachined sensors with quadrature suppression.

SUMMARY OF THE INVENTION

In embodiments of the present invention, quadrature suppression is provided by placing a resonator mass adjacent to a quadrature suppression electrode. The resonator mass is capable of moving substantially parallel to the quadrature suppression electrode and includes a notch formed adjacent to a portion of the quadrature suppression electrode such that a length of resonator mass that is directly adjacent to the quadrature suppression electrode varies as the resonator mass moves relative to the quadrature suppression electrode. The quadrature suppression electrode is capable of producing a lateral force on the resonator mass that varies based on the length of resonator mass that is directly adjacent to the quadrature suppression electrode. Such quadrature suppression can be used in sensors having one or more resonator masses.

In accordance with one aspect of the invention there is provided a micromachined sensor including a quadrature suppression electrode and a resonator mass positioned adjacent to the quadrature suppression electrode. The resonator mass is capable of moving substantially parallel to the quadrature suppression electrode and includes a notch formed adjacent to a portion of the quadrature suppression electrode such that a length of resonator mass that is directly adjacent to the quadrature suppression electrode varies as the resonator mass moves relative to the quadrature suppression electrode. The quadrature suppression electrode is capable of producing a lateral force on the resonator mass that varies based on the length of resonator mass that is directly adjacent to the quadrature suppression electrode. The lateral force is typically an electrostatic force that is produced by either a constant voltage or a varying voltage that is applied to the quadrature suppression electrode.

In accordance with another aspect of the invention there is provided a micromachined sensor including a plurality of quadrature suppression electrodes and a plurality of resonator masses. Each resonator mass is positioned adjacent to a respective one of the quadrature suppression electrodes and is capable of moving substantially parallel to its respective quadrature suppression electrode. Each resonator mass includes a notch formed adjacent to a portion of its respective quadrature suppression electrode such that a length of resonator mass that is directly adjacent to the quadrature suppression electrode varies as the resonator mass moves relative to the quadrature suppression electrode. Each quadrature suppression electrode is capable of producing a lateral force on its respective resonator mass that varies based on the length of resonator mass that is directly adjacent to the quadrature suppression electrode. A voltage may be applied to one or more of the quadrature suppression electrodes to reduce as determined to reduce quadrature of the resonator masses.

In accordance with another aspect of the invention there is provided a micromachined sensor including a substrate; a frame suspended above and substantially parallel to the substrate by a first plurality of suspension flexures disposed along an outer perimeter of the frame, the first plurality of suspension flexures affixed to the substrate and formed so as to substantially prevent translational movement of the frame relative to the substrate within a plane of the frame and to permit rotational movement of the frame about an axis perpendicular to the frame and the substrate; a plurality of quadrature suppression electrodes; and a plurality of resonator structures disposed within an inner perimeter of the frame and operating substantially within the plane of the frame. The resonator structures include a plurality of resonator masses. Each resonator mass is positioned adjacent to a respective one of the quadrature suppression electrodes and is capable of moving substantially parallel to its respective quadrature suppression electrode. Each resonator mass includes a notch formed adjacent to a portion of its respective quadrature suppression electrode such that a length of resonator mass that is directly adjacent to the quadrature suppression electrode varies as the resonator mass moves relative to the quadrature suppression electrode. Each quadrature suppression electrode is capable of producing a lateral force on its respective resonator mass that varies based on the length of resonator mass that is directly adjacent to the quadrature suppression electrode.

BRIEF DESCRIPTION OF THE DRAWINGS

In the accompanying drawings:

FIG. 14 shows a configuration for drive or sensing fingers that are incorporated into a coupling level in which the fingers are raked back at varying angles to accommodate the arcuate motion of the coupling lever, in accordance with an embodiment of the present invention.

DETAILED DESCRIPTION OF A PREFERRED EMBODIMENT

Figure 1:
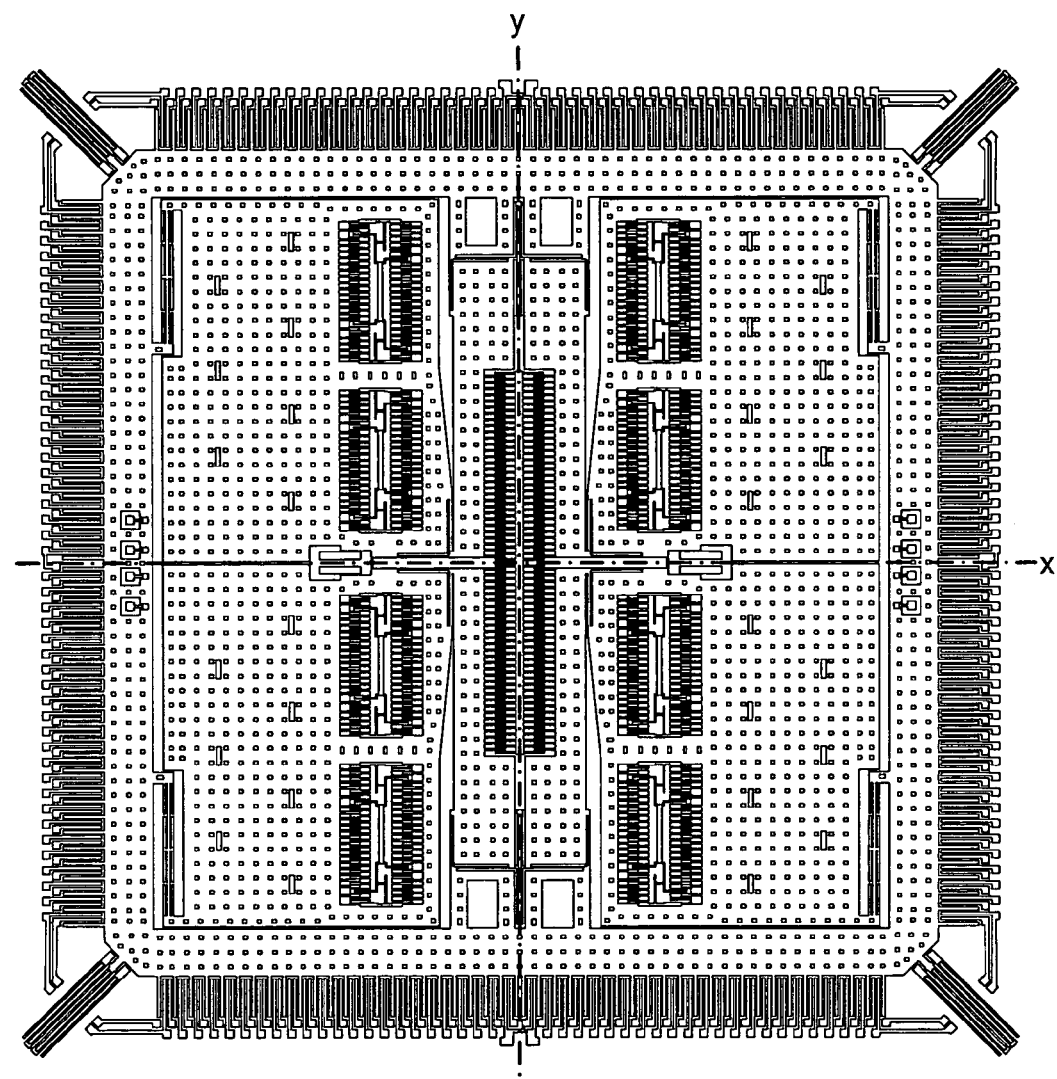
FIG. 1 shows an exemplary micromachined gyroscope structure in accordance with an embodiment of the present invention.

A micromachined gyroscope includes a resonator made to oscillate with a velocity and an accelerometer means for measuring the orthogonal Coriolis acceleration which results from the effect of rotation on that velocity. The usual means of attaching these structures to each other and to an underlying substrate is by filaments of micromachined material that are often referred to as "tethers" or "flexures."

Thus, a micromachined gyroscope makes use of Coriolis acceleration to detect and measure rotation rate about an axis normal to the surface of a substrate. Specifically, various resonating structures are suspended within a frame. The resonating structures include phase and anti-phase masses that are mechanically coupled through levers, pivot flexures, and forks in order to produce a single resonance frequency for the entire resonating system. The mechanical system ensures that the motion of the resonators is severely restricted to one linear axis with no net rotation. Rotation of the micromachined gyroscope about the plane produces a rotational force on the frame. The frame is suspended in such a way that its motion is severely restricted in all but the rotational direction. Sensors on all sides of the frame detect the rotational deflection of the frame for measuring the change in direction.

It has been recognized in the prior art of micromachined gyroscopes that balanced (or symmetric) structures give significantly better performance and that mechanically coupled pairs of resonators are much to be desired. See, for examples, U.S. Pat. Nos. 5,392,650 and 5,635,638. Mechanically coupling the resonating structures has a number of advantages, including increasing the motion of the resonating structures, increasing the amount of Coriolis acceleration (signal) produced by the resonating structures, avoids chaotic motion, prevents motion of the frame in the same direction as the resonating structures, provides better phase definition, provides better rejection of external accelerations, and improves the quality factor Q because angular momentum is canceled locally.

It has proven possible to make satisfactory gyroscopes if a pair of resonators is coupled by electrical means only. An example is described in "Single-Chip Surface Micromachined Integrated Gyroscope" (IEEE JSSC vol. 37 No. 12 December 2002) and U.S. Pat. No. 6,122,961. Manufacturing tolerances are such that two mechanically separate resonators cannot be fabricated with identical frequencies but if the "Q" factors are low enough their resonance curves overlap sufficiently for the pair to function smoothly as a single electrical oscillator.

If more such devices could be manufactured per silicon wafer then the cost of each would be less, so there is an advantage in making smaller structures. In order to obtain low noise and adequate signal from smaller structures, it is necessary to design their resonances with higher "Q" factors. Then, the resonance curves may no longer overlap adequately, making the oscillation lower in amplitude and ill defined in frequency. In extreme cases, the motion becomes chaotic with very deleterious effects on low frequency noise (i.e. short term output instability which prevents accurate navigation, one of the primary uses of the gyroscope).

Certain embodiments of the present invention allow smaller structures to be used by providing a very effective mechanical coupling based on a "double fork" as described in U.S. Pat. No. 5,635,640 for rotating resonators. Co-linear resonator pairs cannot be directly coupled in this way so a set of levers is used to transform the coupled motion from co-linear to parallel motion. The levers have pivots defined at the points of attachment to the accelerometer frame and resonator mass. Each pivot point is defined by the intersection of the axes of at least two orthogonal flexures. This ensures that the attachment point cannot translate with respect to the lever, only rotate. Translational compliance would compromise suppression of unwanted motions, as described later. Netzer displays a similar idea in FIGS. 8 through 11 of U.S. Pat. No. 5,763,781. However, none of those structures will work in a practical micromachined gyroscope of the type described in this disclosure because, first, the pivots are defined by single flexures allowing unacceptable orthogonal motions, second, the same defect of design allows too much compliance to in-phase motion of the coupled masses and, third, they allow no stress stiffening relief, the provision of which is essential, as also described later.

It is also known to be very advantageous to suppress the so-called "quadrature" signals which arise from the resonator and accelerometer axes being imperfectly orthogonal. The suppression means may be electrical, as described by Howe et al in U.S. Pat. Nos. 6,067,858 and 6,250,156, or mechanical as described by Geen in U.S. Pat. No. 6,122,961. The latter uses separate resonator and accelerometer frames together with a system of levers and flexures to inhibit unwanted motions and is very effective in practice. However, that configuration is topologically incompatible with direct mechanical coupling of the resonators. First, half the accelerometer fingers, those in between the resonators, would be lost, reducing the signal substantially. Second, the linear Coriolis forces from the resonator pair would cancel in an accelerometer frame attached to them both.

Certain embodiments of the present invention permit the mechanical coupling of resonators without loss of accelerometer signal from a separate, quadrature-suppressed frame. This is accomplished by recognizing that the coupled antiphase resonator masses produce a Coriolis torque proportional to the separation of their centers of mass even though the linear Coriolis forces cancel. Thus, a surrounding accelerometer frame can be adapted to detect rotational rather than linear motion. Then, mechanical quadrature suppression becomes a matter of inhibiting any net rotational motion of the co-linear resonator pair and preventing linear motions of the accelerometer. Also, all four sides of a rectangular accelerometer frame move when it rotates so that all may be lined with fingers to detect that motion, thereby restoring the total sensitivity to that of two linear accelerometers but in half the total area compared with the prior art of U.S. Pat. No. 6,122,961.

Another problem encountered is that for a large Coriolis signal the resonators should have a large travel. The primary flexures of the resonator will "stress stiffen" in these circumstances. That is, they have to reach further when deflected and the resulting stretching causes longitudinal tension in the flexure with a marked increase in lateral stiffness. The relative increase in stiffness is well known to vary as the square of the ratio of the lateral deflection to the width of the tether. Thus, a typical 1.7 micrometer wide tether deflecting by 10 micrometers would stiffen by a factor of 36 which would give unacceptable non-linearity, require much more drive force and make the resonant frequency ill-defined by a large factor. This longitudinal stress can be relieved by simple transverse flexures, as in U.S. Pat. No. 5,392,650, but this allows overall resonator motion in the tether longitudinal direction and prevents mechanical quadrature suppression.

Certain embodiments of the present invention provide a means of relieving the longitudinal tension in the tethers without taking the space for extra levers as were used in the prior art of U.S. Pat. No. 6,122,961. This is achieved by using the resonator masses themselves, including the drive mechanism, as stress reduction levers. The elimination of the extra, tether-suspended levers not only saves area, but also enhances the overall out-of-plane stiffness of the gyroscope. This makes the device more rugged and suitable for use in vehicle locations experiencing large shocks or vibration, such as in the engine compartment of a car.

In certain embodiments of the invention, a resonator mass is modified to relieve tension by splitting it and rejoining with a very short flexure. This allows the mass to pivot slightly about the flexure such that diagonally opposite corners can then simultaneously accommodate the shortening of the projected lengths of both the primary resonator flexure and the coupling lever. The distances from the pivot to the flexure and lever must be in the correct proportion to effectively relieve both so the positioning of the short flexure is critical, but this not a difficult calculation in geometry.

In an exemplary embodiment of the present invention, the micromachined gyroscope includes two phase masses and two anti-phase masses that are mechanically coupled through levers, pivot flexures, and forks. Ideally, this provides a single resonance frequency. The single resonance frequency provides a higher Q factor, and therefore more signal. The configuration of the coupling reduces extraneous forces on the frame (such as translational and rotational forces caused by unbalanced motion of the resonating structures) that can be misread as Coriolis accelerations.

Certain embodiments of the present invention incorporate drive or sensing fingers into the coupling levers in order to save area. The effectiveness of the resonator mass in producing Coriolis torque from its velocity is proportional to its distance from the center line. Consequently, it is desirable that resonator drive apparatus, or velocity sensing apparatus for the purpose of completing an electromechanical oscillator, should be placed as close to the center line as possible. This most effectively utilizes the available area. Removing part of the apparatus from the mass to the coupling lever is, therefore, particularly advantageous.

Because the lever moves in an arc, interdigitated fingers placed on it mesh at different angles along its length, depending on the radius from the pivot point of the lever. Therefore, in order to prevent the moving fingers from excessive lateral motion with respect to a fixed, interdigitated comb, the fingers may be raked back at varying angles as dictated by the geometry of the lever. This is shown in FIG. 14.

A similar issue exists with the accelerometer frame and the sensing fingers placed around its periphery, since the accelerometer frame is adapted to rotate. Therefore, the sensing finger could likewise be raked back at varying angles. However, the rotation of the accelerometer frame is typically much less than the rotation of the levers (perhaps $1/100,000^{th}$), so such raking is typically not used for the sensing fingers.

Certain embodiments of the present invention allow the quadrature signal to be finely trimmed to near null. Despite the suppression of quadrature by the configuration of the suspension flexures and levers, there is a residual quadrature element from distortion of the accelerometer frame by the reaction forces of the resonator suspended from it. It is desirable to keep this frame as light as possible both to save space and to maximize its response to Coriolis forces. Unfortunately, a light frame distorts more, so there is a compromise in design which allows some residual quadrature. This can be trimmed to near zero using a general principle described by Clark in U.S. Pat. No. 5,992,233 which uses an array of fingers arranged in groups of 3 at different voltages so as to provide a lateral force which varies with the meshing of the fingers. Embodiments of the present invention instead use a notch cut from the edge of the resonator mass. This has the advantage of consuming less space than the finger array and lending itself to being accommodated in otherwise unusable areas.

The drive fingers work longitudinally using interdigitated combs, some moving, and some attached to the substrate. The principle is that described by Tang and Howe in U.S. Pat. No. 5,025,346. One of the most troublesome side effects of using longitudinal electrostatic comb drives for gyroscopes is that small imbalances of the gaps between the fingers induce lateral motion as well as the desired longitudinal component. This motion has a component with the unfortunate property of being in-phase with the Coriolis signal so that, unlike the much larger quadrature signal, it cannot be rejected by a phase sensitive rectifier. Any instability of this in-phase signal becomes directly a gyroscope error. One of the most significant ways in which the gaps can become imbalanced is by relative motion of the substrate anchor points of the fixed fingers and the moving structure. Another is the displacement of the moving structure from external accelerations. Fortunately, most of these can be made to cancel by careful attention to the symmetries of the structure and the drive apparatus. However, surface shear distortion of the substrate is particularly difficult to accommodate in this way. It is easily caused by variations in package stress induced during use and produces both a relative displacement of arrays of fixed fingers and a rotation of the individual finger anchors.

In certain embodiments of the present invention, the anchors for pairs of antiphase arrays of fixed drive fingers are arranged to be co-linear in the lateral direction. In this way, any surface shear of the substrate will not cause them to move laterally with respect to each other. Also, the anchors are typically laid down in pairs joined to each other at the top ends, remote from the substrate, so that the tops resist the individual twisting at the substrate end. Furthermore, the finger busbars are typically attached to the top ends by flexible, folded fingers. These provide isolation of the busbar from any distortion transmitted by the anchor pairs and from displacement by shrinkage stresses in the micromachined material. They also serve as drivers thereby minimizing the loss of drive from the isolation measures. The finger attachment means provide about an order of magnitude improvement in the gyroscope performance.

FIG. 1 shows an exemplary micromachined gyroscope structure 100 in accordance with an embodiment of the present invention. Micromachined gyroscope structure 100 is typically one of many micromachined from a single silicon wafer. The micromachined gyroscope structure 100 is typically mounted to a substrate. The micromachined gyroscope structure 100 is substantially symmetrical top-to-bottom along the x axis as well as side-to-side along the y axis.

Figure 2:
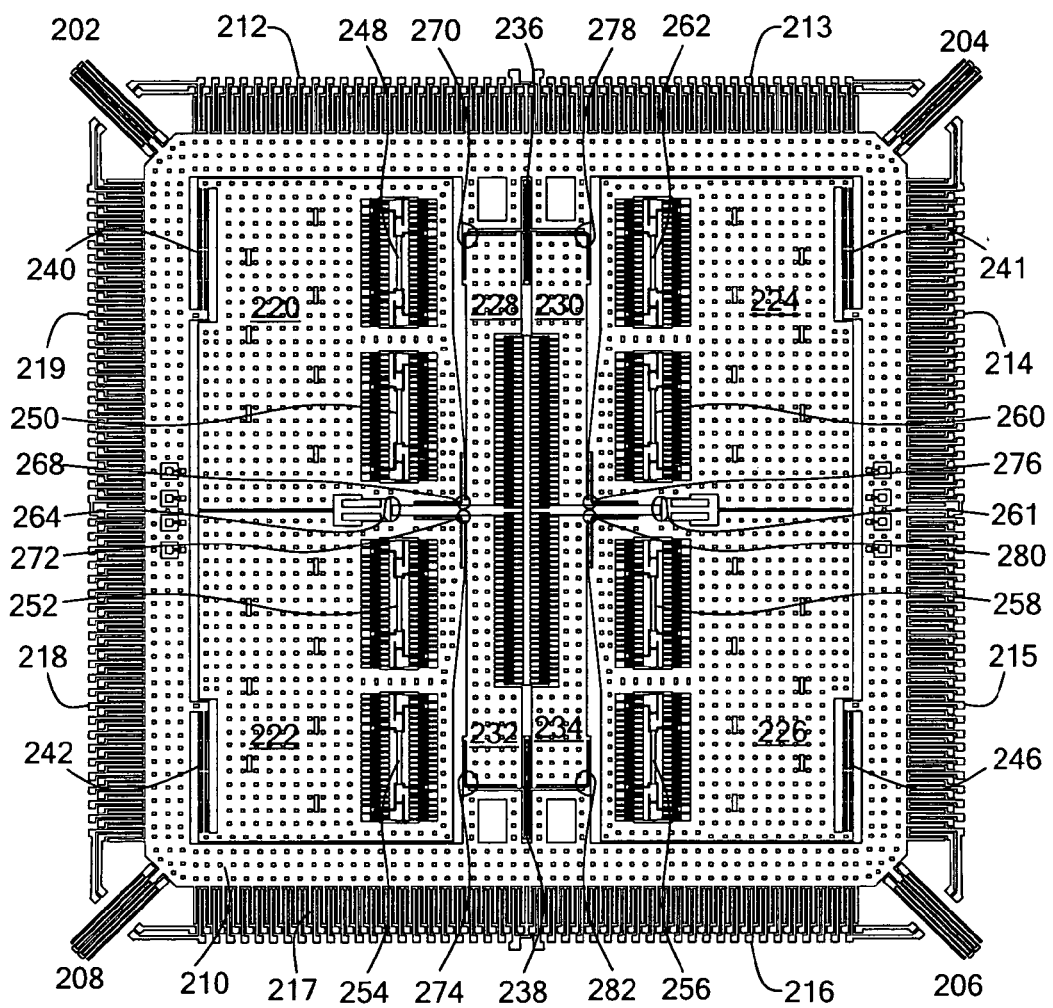
FIG. 2 identifies various components of the micromachined gyroscope structure in accordance with an embodiment of the present invention.
Figure 3:
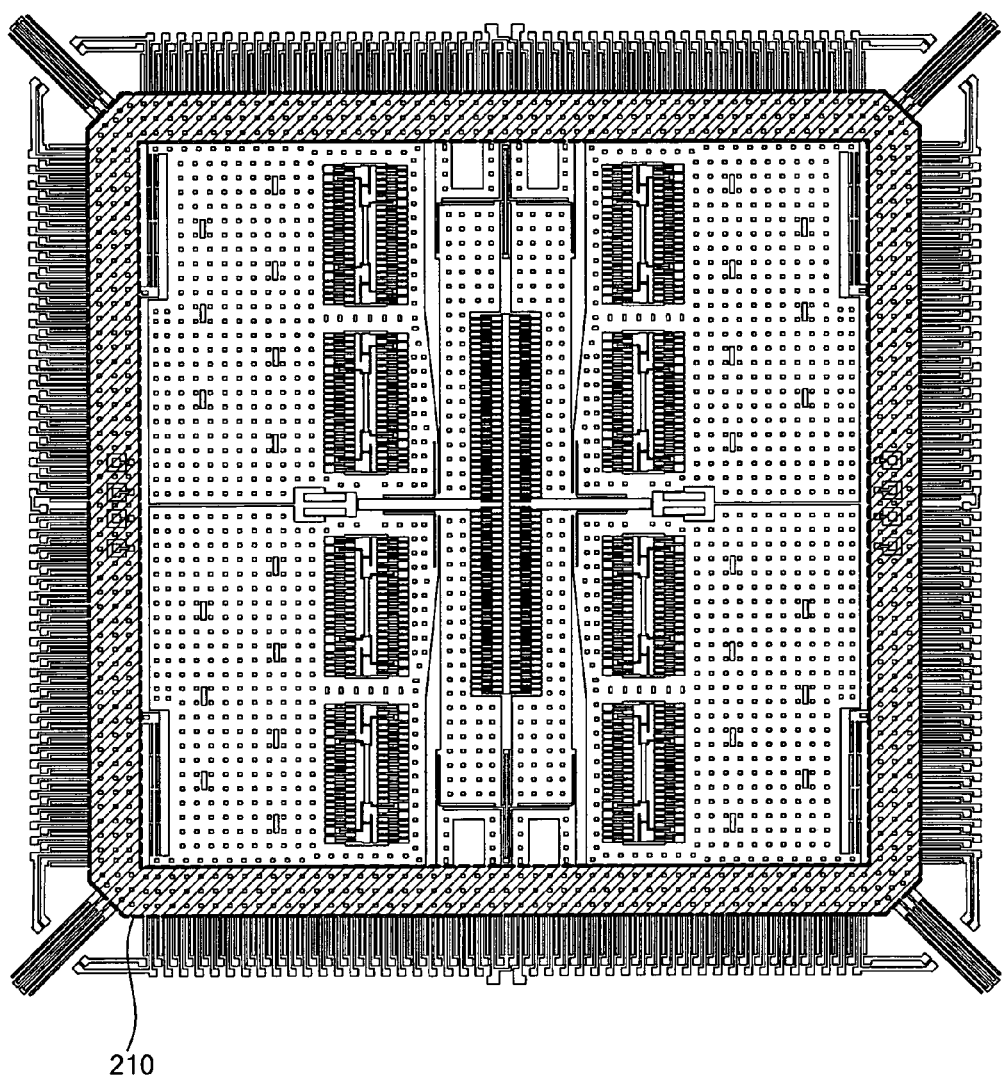
FIG. 3 shows a highlighted view of the frame of the micromachined gyroscope structure in accordance with an embodiment of the present invention.
Figure 4:
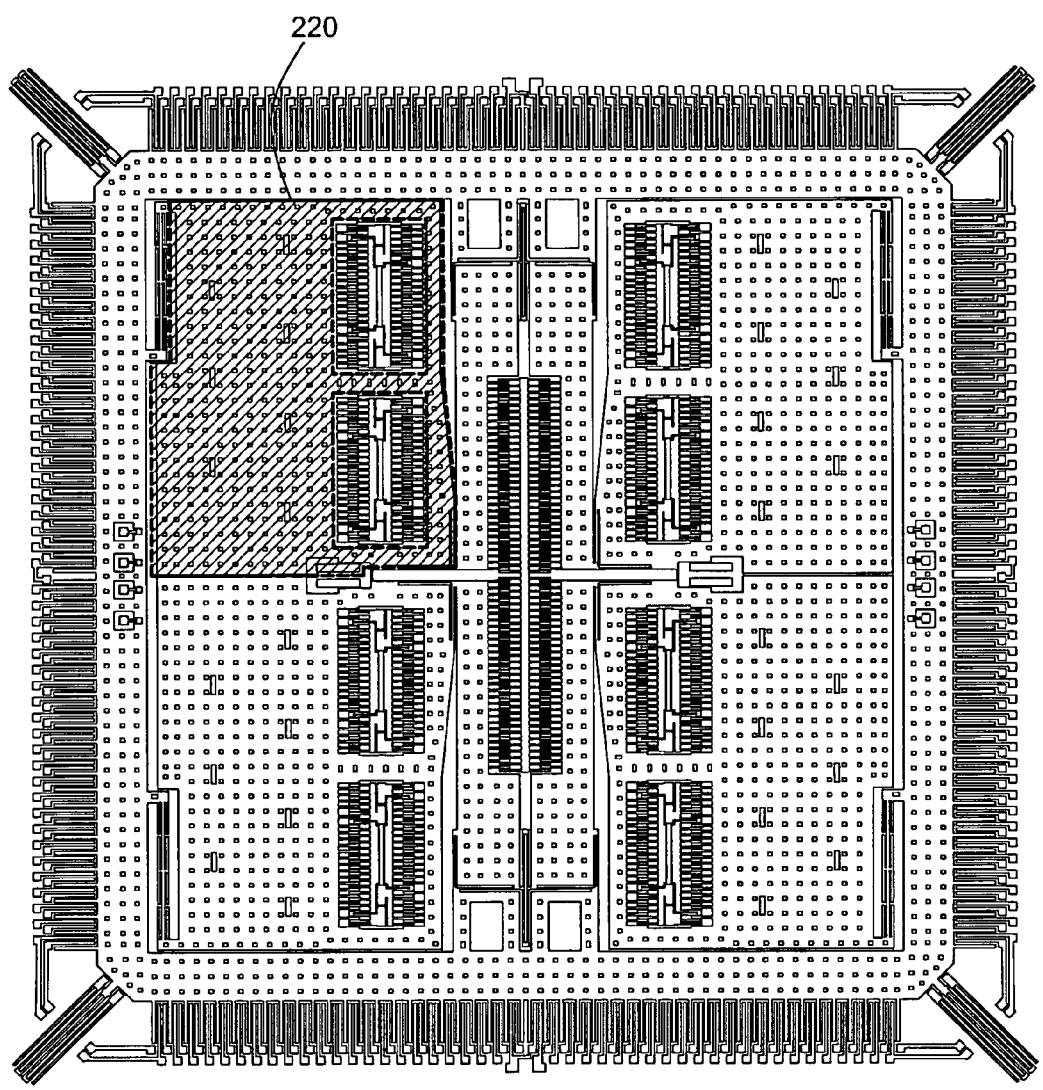
FIG. 4 shows a highlighted view of a movable mass of the micromachined gyroscope structure in accordance with an embodiment of the present invention.
Figure 5:
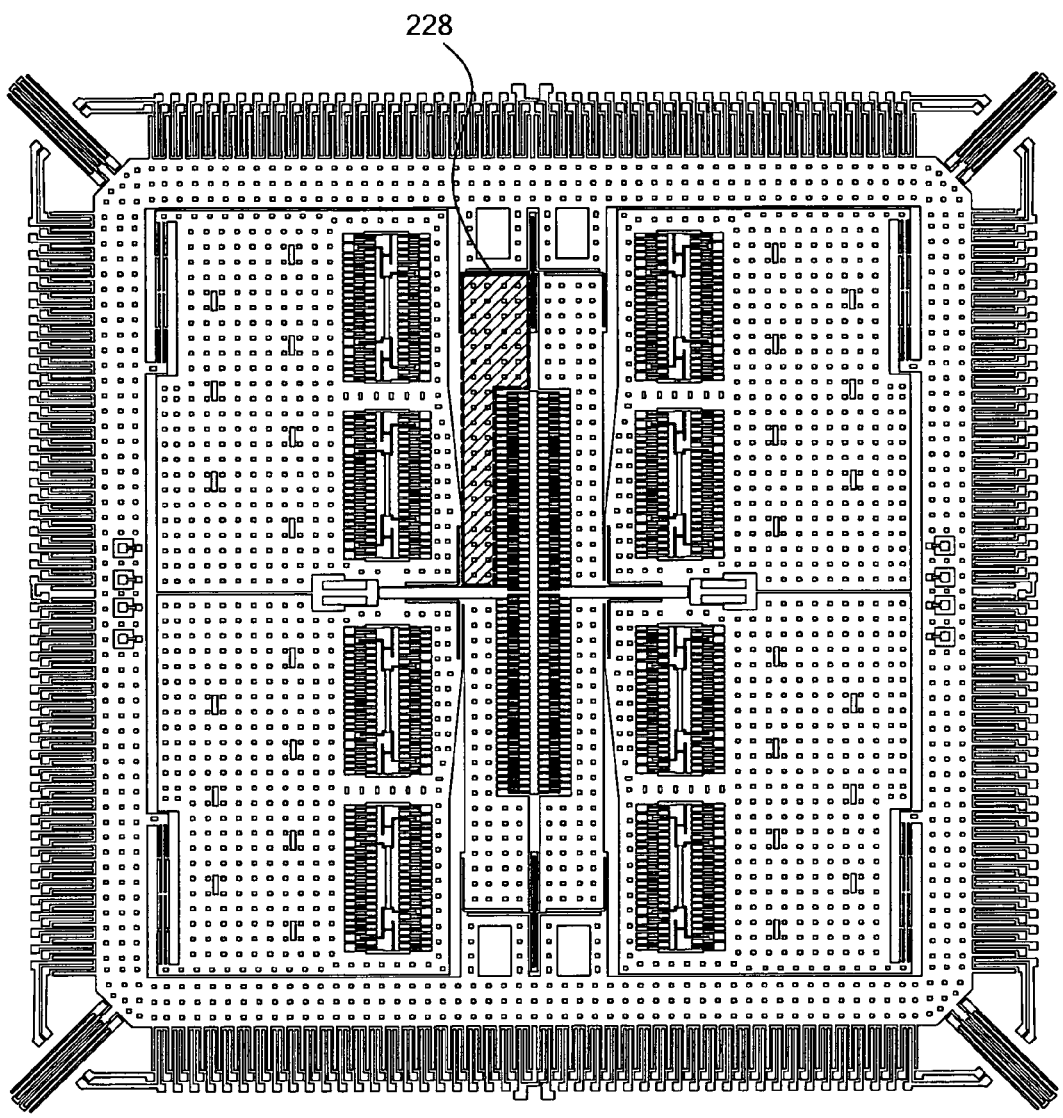
FIG. 5 shows a highlighted view of a lever of the micromachined gyroscope structure in accordance with an embodiment of the present invention.

FIG. 2 identifies various components of the micromachined gyroscope structure 100. Among other things, the micromachined gyroscope structure 100 includes a substantially square frame 210 that is suspended at its four corners by accelerometer suspension flexures 202, 204, 206, and 208. FIG. 3 shows the frame 210 highlighted. On the outside four edges of the frame 210 are fingers 212, 213, 214, 215, 216, 217, 218, and 219. Various resonating structures are suspended within the frame 210. These resonating structures include four movable masses 220, 222, 224, and 226, four levers 228, 230, 232, and 234, and two forks 236 and 238. FIG. 4 shows the mass 220 highlighted. It should be noted that the masses 222, 224, and 226 are substantially the same shape, size, and mass as the mass 220, and are oriented as mirror images of the mass 220 along the x and/or y axes. FIG. 5 shows the lever 228 highlighted. It should be noted that the levers 230, 232, and 234 are substantially the same shape, size, and mass as the lever 228, and are oriented as mirror images of the lever 228 along the x and/or y axes. The four movable masses 220, 222, 224, and 226 are suspended from the frame 210 by flexures 240, 242, 244, and 246, respectively. Movement of the four movable masses 220, 222, 224, and 226 is controlled electrostatically using electrostatic drivers 248, 250, 252, 254, 256, 258, 260, and 262. These and other features of the micromachined gyroscope structure 100 are described in more detail below.

The four accelerometer suspension flexures 202, 204, 206, and 208 help to control movement of the frame 210 relative to the substrate. The four accelerometer suspension flexures 202, 204, 206, and 208 substantially restrict movement of the frame 210 along the x axis and along the y axis (i.e., translational movement), but allow the frame 210 to rotate more freely in either direction (i.e., rotational movement). Such rotational movement of the frame 110 is caused mainly from the coriolis effect due to movement of the frame of reference of the resonating structures.

Figure 6:
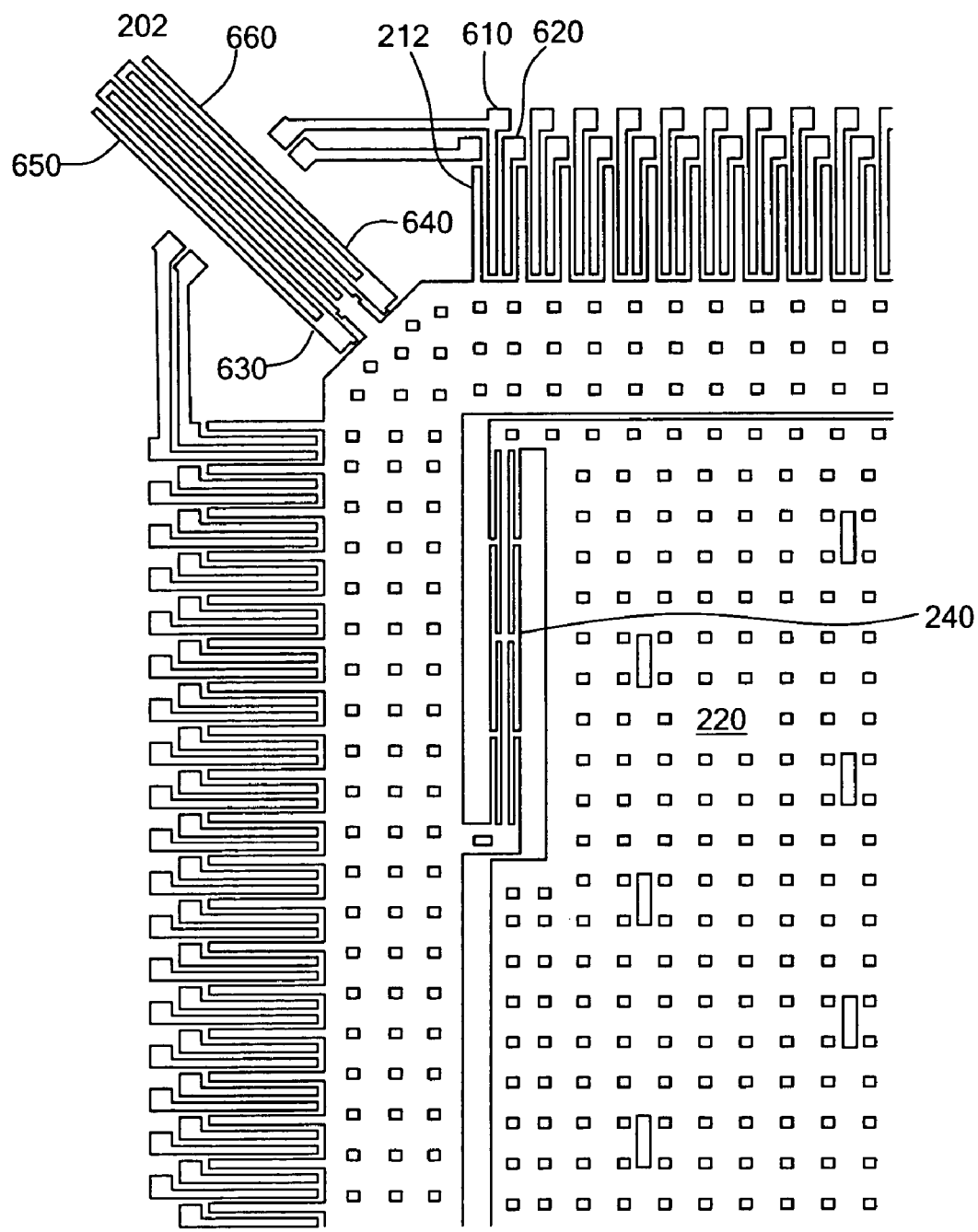
FIG. 6 shows a detailed view of an accelerometer suspension flexure in accordance with an embodiment of the present invention.

FIG. 6 shows the accelerometer suspension flexure 202 in greater detail.

The accelerometer suspension flexure 202 is anchored to the substrate at locations 630 and 640. The accelerometer suspension flexure 202 substantially restricts translational movement of the frame 210, but allows for rotational movement of the frame 210. The structures 650 and 660 are etch equalizers that are used to ensure accurate formation of the other flexure structures. This principle is taught in U.S. Pat. No. 6,282,960. It should be noted that the accelerometer suspension flexures 204, 206, and 208 are substantially the same as the accelerometer suspension flexure 202.

The fingers 212, 213, 214, 215, 216, 217, 218, and 219 extend from the four sides of the frame 210. Positioned between the fingers 212, 213, 214, 215, 216, 217, 20 218, and 219 are two sets of coriolis detectors.

FIG. 6 shows the relationship between a finger 212 and two coriolis detectors 610 and 620.

The two sets of coriolis detectors 610 and 620 are mechanically coupled to the substrate and do not move relative to the substrate. Movement of the frame 210 results in movement of the fingers 212, 213, 214, 215, 216, 217, 218, and 219 relative to the coriolis detectors, as described below. Movement of the fingers 212, 213, 214, 215, 216, 217, 218, and 219 relative to the coriolis detectors produces a change in capacitance that can be measured by electronic circuitry (not shown). This can be done in a variety of ways.

Figure 10:
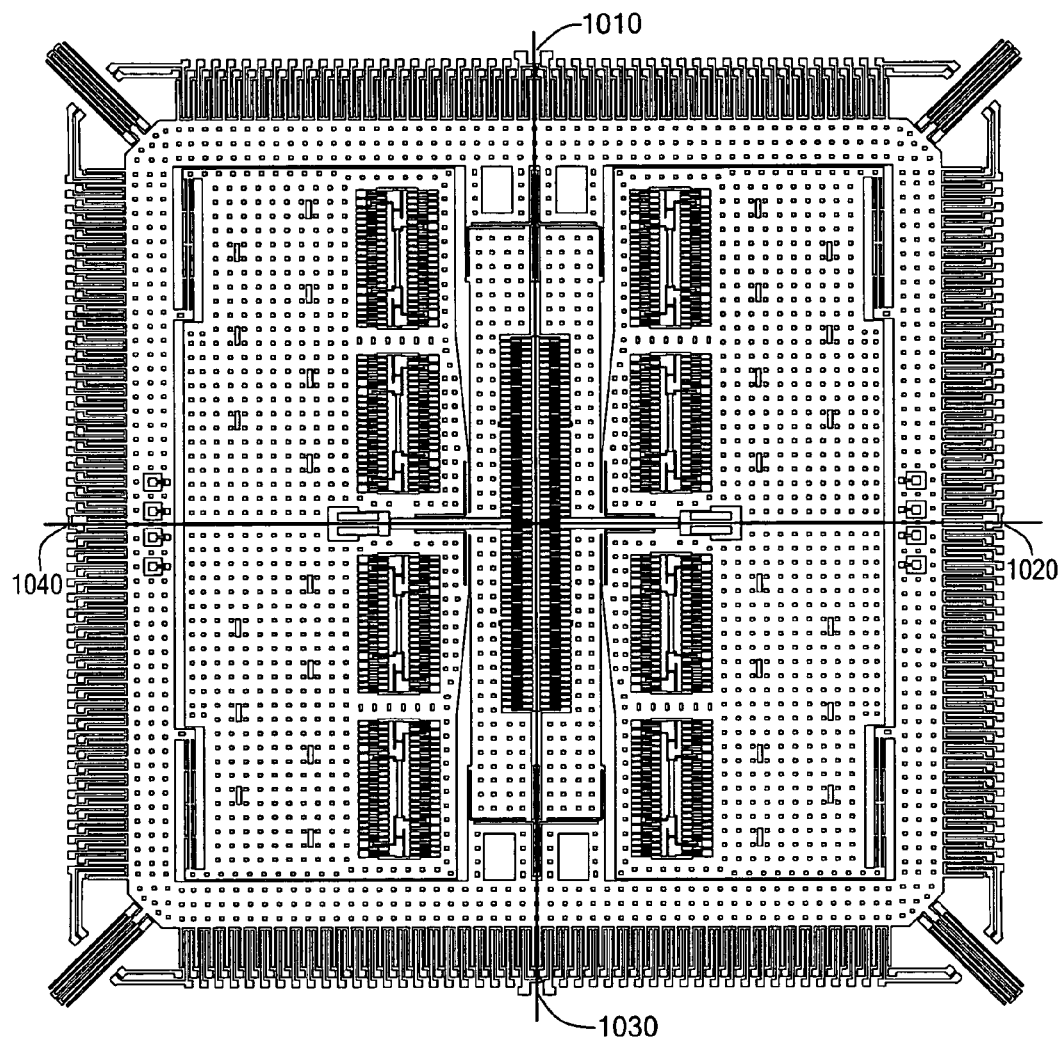
FIG. 10 shows the coriolis detector switch-overs for the double differential configuration in accordance with an embodiment of the present invention.

The two sets of coriolis detectors 610 and 620 are coupled through four switch-overs 1010, 1020, 1030, and 1040 in a double differential fashion, as shown in FIG. 10. The switch-overs 1010, 1020, 1030, and 1040 substantially cancel signals induced electrically from surrounding circuits and signals produced by translational movement of the frame 210 but substantially amplify signals produced by rotational movement of the frame 210. Specifically, when there is translational movement of the frame 210, approximately half of the coriolis detectors produce a signal and the other half produce a substantially equal and opposite signal, resulting in a net signal of zero. Thus, translational movements of the frame 210 are substantially canceled out electronically. When there is rotational movement of the frame 210, however, all coriolis detectors produce complementary signals that, when combined and amplified, represents the magnitude of the rotational movement. By placing fingers and coriolis detectors on all sides of the frame 210, a larger signal is produced as opposed to a solution in which fingers and coriolis detectors are placed on only two sides of the frame 210.

The resonating structures, including the masses 220, 222, 224, and 226, the flexures 240, 242, 244, and 246, the levers 228, 230, 232, and 234, and the forks 236 and 238, are mechanically coupled. With reference again to FIG. 2, the masses 220 and 222 are mechanically coupled via a pivot flexure 264, and the masses 224 and 226 are mechanically coupled via a pivot flexure 266. The masses 220 and 224 are mechanically coupled via the levers 228 and 230 and the fork 236, and the masses 222 and 226 are mechanically coupled via the levers 232 and 234 and the fork 238. The pivot flexures 264 and 266, the levers 228, 230, 232, and 234, and the forks 236 and 238 allow the masses 220, 222, 224, and 226 to move together.

The mass 220 is suspended from the frame 210 by the flexure 240, from the mass 222 by the pivot flexure 264, and from the lever 228 by the pivot flexure 268. The mass 222 is suspended from the frame 210 by the flexure 242, from the mass 220 by the pivot flexure 264, and from the lever 232 by the pivot flexure 272. The mass 224 is suspended from the frame 210 by the flexure 244, from the mass 226 by the pivot flexure 266, and from the lever 230 by the pivot flexure 276. The mass 226 is suspended from the frame 210 by the flexure 246, from the mass 224 by the pivot flexure 266, and from the lever 234 by the pivot flexure 280.

The lever 228 is suspended from the frame 210 by the pivot flexure 270, from the mass 220 by the pivot flexure 268, and from the lever 230 by the fork 236. The lever 230 is suspended from the frame 210 by the pivot flexure 278, from the mass 224 by the pivot flexure 276, and from the lever 228 by the fork 236. The lever 232 is suspended from the frame 210 by the pivot flexure 274, from the mass 222 by the pivot flexure 272, and from the lever 234 by the fork 238. The lever 234 is suspended from the frame 210 by the pivot flexure 282, from the mass 226 by the pivot flexure 280, and from the lever 232 by the fork 238.

Figure 7:
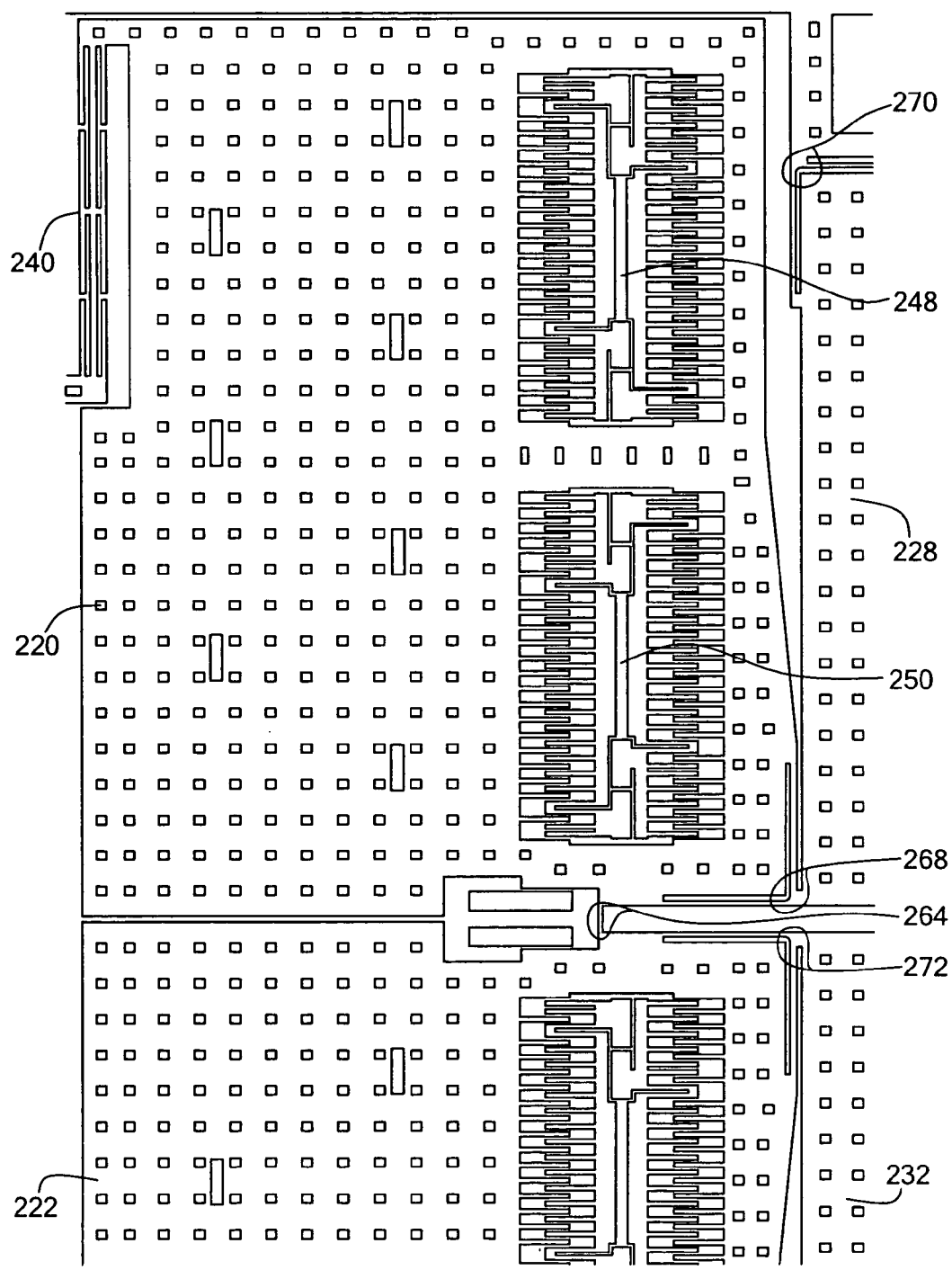
FIG. 7 shows a detailed view of a movable mass and its related flexures and pivot flexures in accordance with an embodiment of the present invention.

FIG. 7 shows the mass 220 and related components in greater detail. The mass 220 is suspended from the frame 210 by the flexure 240, from the mass 222 by the pivot flexure 264, and from the lever 228 by a pivot flexure 268. The flexure 240 is preferably formed from three parallel etches, where the center etch is unbroken and the outer etches are broken in two places. The outer etches are etch equalizers that are used to ensure accurate formation of the center etch. It should be noted that the masses 222, 224, and 226 and their related components are substantially the same as the mass 220 and its related components.

Figure 8:
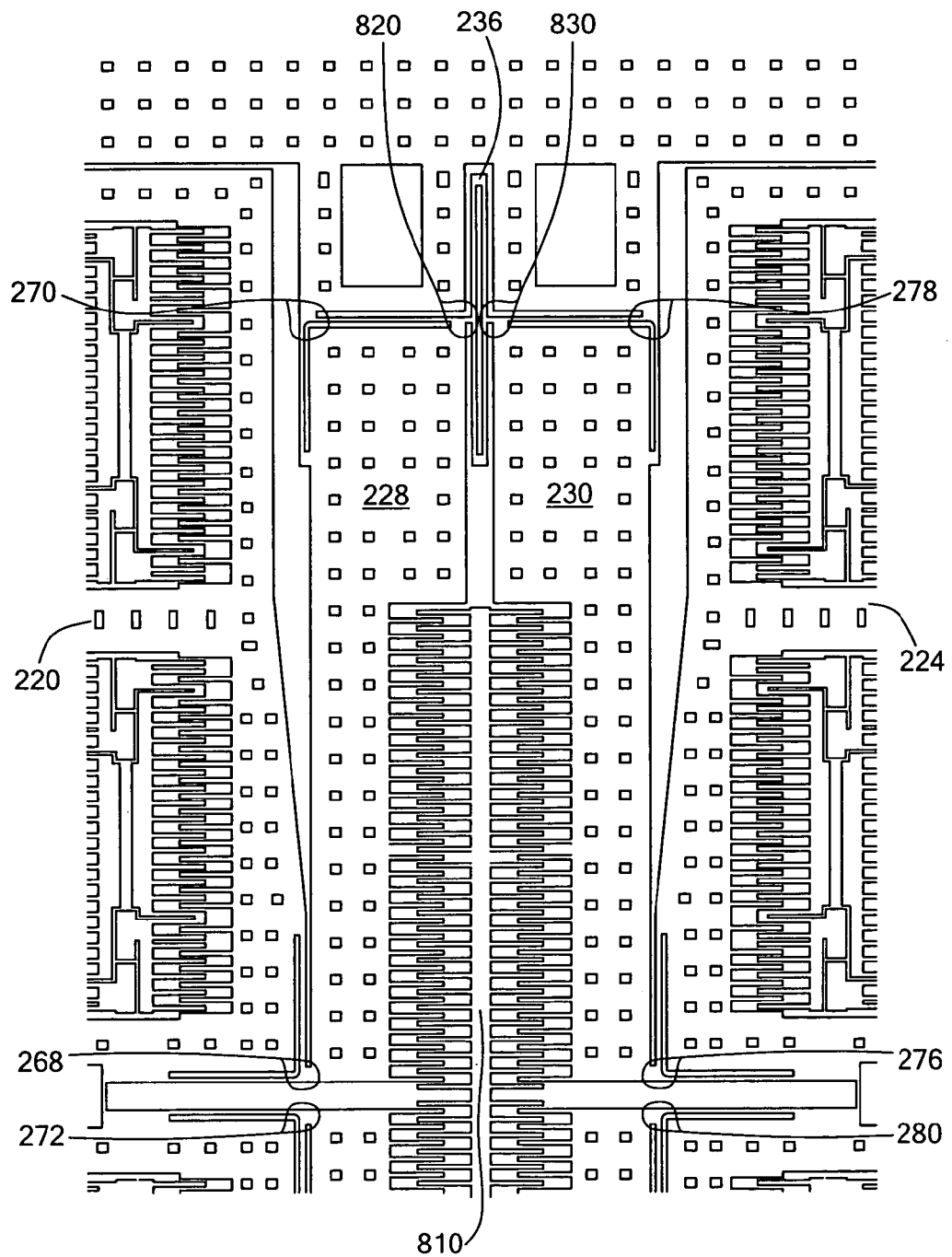
FIG. 8 shows a detailed view of two levers and a fork and their related pivot flexures and electrostatic driver in accordance with an embodiment of the present invention.

FIG. 8 shows the levers 228 and 230 and their related components in greater detail. The lever 228 is suspended from the frame 210 by the pivot flexure 270, from the mass 220 by the pivot flexure 268, and from the fork 236 by the pivot flexure 820. The lever 230 is suspended from the frame 210 by the pivot flexure 278, from the mass 224 by the pivot flexure 276, and from the fork 236 by the pivot flexure 830. The fork 236 is suspended from the lever 228 by the pivot flexure 820 and from the level 230 by the pivot flexure 830. It should be noted that the levers 232 and 234 and their related components are substantially the same as the levers 228 and 230 and their related components.

The flexures 240, 242, 244, and 246 substantially restrict movement of the masses 220, 222, 224, and 226 respectively along the y axis, but allow movement of the masses 220, 222, 224, and 226 respectively along the x axis. The flexures 240, 242, 244, and 246 also allow the masses 220, 222, 224, and 226 respectively to pivot slightly as they move.

The pivot flexure 264 essentially locks the masses 220 and 222 together so that they move together. Likewise, the pivot flexure 266 essentially locks the masses 224 and 226 together so that they move together (although oppositely to the masses 220 and 222).

The levers 228 and 230, the fork 236, and the pivot flexures 268, 270, 820, 830, 276, and 278 essentially lock the masses 220 and 224 together so that they move in substantially equal but opposite directions. The levers 232 and 234, the fork 238, the pivot flexures 272, 274, 280, and 282, and the pivot flexures coupling the levers 232 and 234 to the fork 238 (not shown) essentially lock the masses 222 and 226 together so that they move in substantially equal but opposite directions.

The levers 228 and 230 essentially translate the substantially equal but opposite side-to-side motion of the masses 220 and 224 into a substantially linear motion of the fork 236 along the y axis. Specifically, the side-to-side motion of the mass 220 is transferred to the lever 228 through the pivot flexure 268, while the side-to-side motion of the mass 224 is transferred to the lever 230 through the pivot flexure 276. The levers 228 and 230 pivot at pivot flexures 270 and 278, respectively, and at pivot flexures 820 and 830, respectively, to cause the linear motion of the fork 236 along the y axis. These transfers cause the masses 220 and 224 to pivot slightly as they move side-to-side. Specifically, the mass 220 pivots slightly toward the mass 222 when moving to the left and slightly away from the mass 222 when moving to the right, while the mass 224 pivots slightly toward the mass 226 when moving to the right and slightly away from the mass 226 when moving to the left.

Likewise, the levers 232 and 234 essentially translate the substantially equal but opposite side-to-side motion of the masses 222 and 226 into a substantially linear motion of the fork 238 along the y axis. Specifically, the side-to-side motion of the mass 222 is transferred to the lever 232 through the pivot flexure 272, while the side-to-side motion of the mass 226 is transferred to the lever 234 through the pivot flexure 280. The levers 232 and 234 pivot at pivot flexures 274 and 282, respectively, and at the pivot flexures coupling the levers 232 and 234 to the fork 238 (not shown), respectively, to cause the linear motion of the fork 238 along the y axis. These transfers cause the masses 222 and 226 to pivot slightly as they move side-to-side. Specifically, the mass 222 pivots slightly toward the mass 220 when moving to the left and slightly away from the mass 220 when moving to the right, while the mass 226 pivots slightly toward the mass 224 when moving to the right and slightly away from the mass 224 when moving to the left.

It should be noted that the symmetry of the resonator together with the precision of the antiphase motion causes the angular momenta from the pivoting motions to cancel and not induce rotation of the accelerometer frame.

Figure 9:
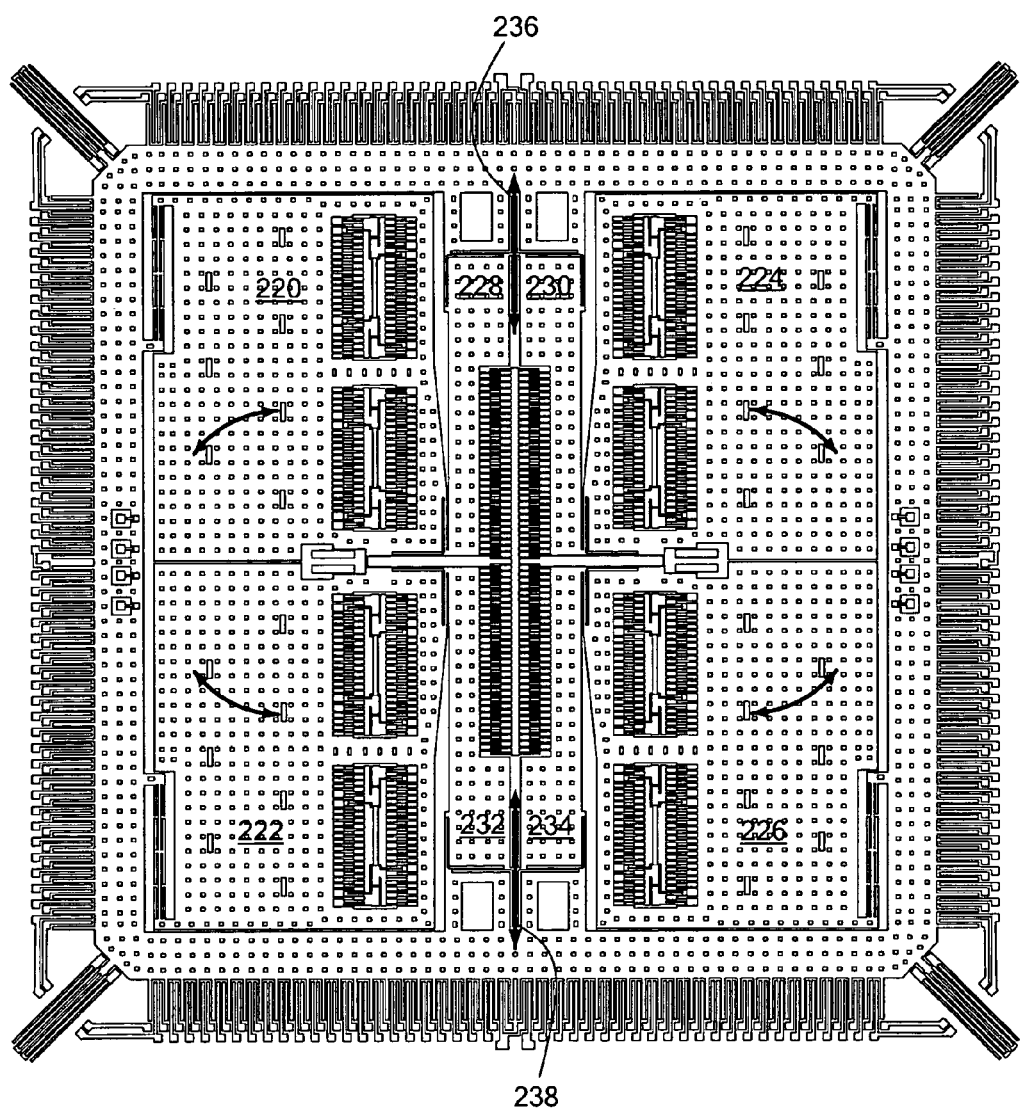
FIG. 9 shows a representation of the motions of the various resonating structures of the micromachined gyroscope structure in accordance with an embodiment of the present invention.

FIG. 9 shows the relative movement of the masses 220, 222, 224, and 226 and the forks 236 and 238. It should be noted that, in actuality, these and other resonator structures move extremely small distances, and the arrows are greatly exaggerated to show that the masses 220, 222, 224, and 226 move side-to-side and pivot.

Figure 11:
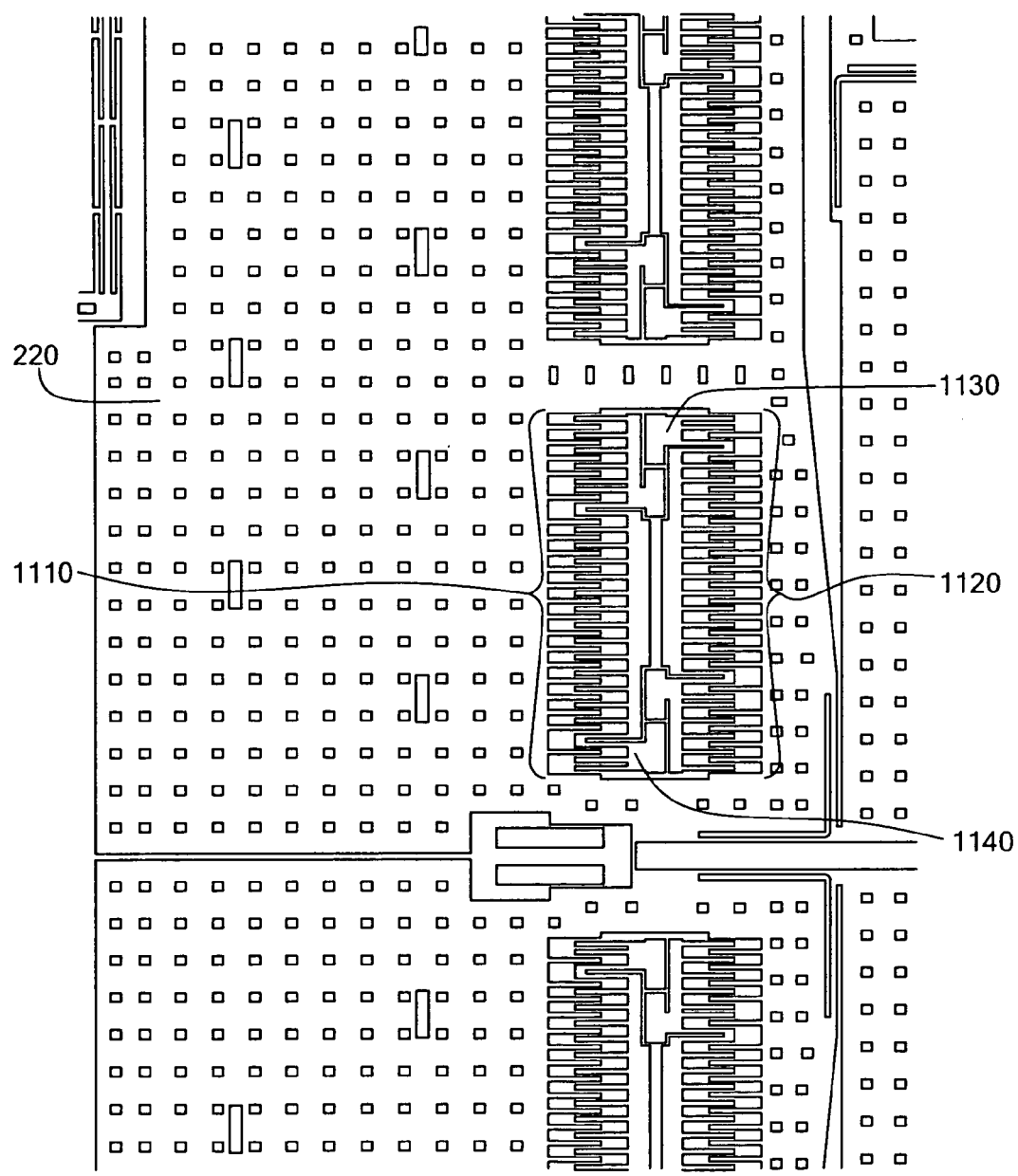
FIG. 11 shows a detailed view of an electrostatic driver for a movable mass in accordance with an embodiment of the present invention.

As discussed above, the masses are moved and controlled electrostatically using electrostatic drivers. FIG. 11 shows a detailed view of an electrostatic driver, and, in particular, the electrostatic driver 250 for mass 220. The electrostatic driver 250 is micromachined so as to form a cavity within the mass 220 that includes two sets of drive fingers 1110 and 1120 that are integral to the mass 220 and two sets of electrode fingers 1130 and 1140 that are disposed within the cavity and are coupled to the substrate. The electrode fingers 1140 fit around and between the drive fingers 1110, and the electrode fingers 1130 fit around and between the drive fingers 1120. When a voltage is applied to the electrode fingers 1140, the drive fingers 1110 are pulled toward the electrode fingers 1140, generating a force on the mass 220 toward the right. When a voltage is applied to the electrode fingers 1130, the drive fingers 1120 are pulled toward the electrode fingers 1130, generating a force on the mass 220 toward the left. Applying voltages alternately to the electrode fingers 1130 and to the electrode fingers 1140 causes the mass to move back and forth. The two sets of electrode fingers 1130 and 1140 are preferably anchored to the substrate linearly in order to reduce torque produced by surface shear of the substrate that can produce torque on the mass 220. It should be noted that the electrostatic drivers 248, 252, 254, 256, 258, 260, and 262 are substantially the same as the electrostatic driver 250.

It should be noted that the electrostatic drivers 248, 252, 254, 256, 258, 260, and 262 are positioned close to the middle of the micromachined gyroscope structure 100 so that most of the mass is away from the center. This increases the sensitivity of the micromachined gyroscope structure 100 to Coriolis accelerations.

There is also an electrostatic driver for the levers 228, 230, 232, and 234. FIG. 8 shows a portion of the electrostatic driver 810 for the levers 228, 230, 232, and 234. The electrostatic driver 810 is micromachined so as to form a drive fingers on each lever and a set of electrode fingers that are coupled to the substrate. The electrode fingers fit around and between the drive fingers. When a voltage is applied to the electrode fingers, the drive fingers are pulled toward the electrode fingers, generating a force on each lever toward the electrode fingers. The electrostatic driver 810 is used to reinforce the movement of the resonating structures. An alternative use for these is to sense the velocity of the resonator. That velocity signal can be used to close an electromechanical oscillator loop which will excite the resonance.

It should be noted that the resonating structures are preferably driven at or near their natural resonance frequency in order to enhance the range of motion of the resonating structures. This in turn increases the sensitivity of the gyroscope.

It should be noted that, in theory, the various gyroscope structures are perfectly balanced so that they move with substantially the same frequency and phase. In practice, however, the various gyroscope structures are not perfectly balanced. For example, the masses 220, 222, 224, and 226 are theoretically identical (albeit mirror images in the x and/or y axes), but typically are not identical due at least in part to variations in the material and processes used to form the masses. Similar imbalances can occur in other gyroscope structures, such as the various levers, pivots, and flexures. These imbalances can manifest themselves in out-of-phase lateral movements of the masses (referred hereinafter to as "quadrature"), and can vary from device to device. The mechanical stifffnesses of the structures substantially suppresses these motions, but there is some residual quadrature.

Therefore, electrical quadrature suppression structures are typically used to reduce the amount of quadrature. The general principle was taught by Clark in U.S. Pat. No. 5,992,233. In an embodiment of the present invention, a quadrature suppression structure typically includes at least one electrode located proximately to a portion of a mass along the direction of motion of the mass. When a voltage is applied to the electrode, a resulting electrostatic force produces a lateral force that attracts the mass toward the electrode. A single electrode is typically associated with each mass, although not all electrodes are typically activated. Rather, the quadrature behavior of a particular device is typically characterized to determine which (if any) electrodes to activate to reduce the quadrature.

Because the amount of quadrature varies with the movement of the mass, it is preferable for the lateral force applied by the electrode to likewise vary with the movement of the mass.

One way to vary the lateral force applied to the mass by the electrode is to vary the voltage applied to the electrode based upon the position of the mass. Specifically, the voltage would be increased as the mass moves outward toward the frame and would be decreased as the mass moves inward away from the frame. Such a solution would be very difficult in practice.

Figure 12:
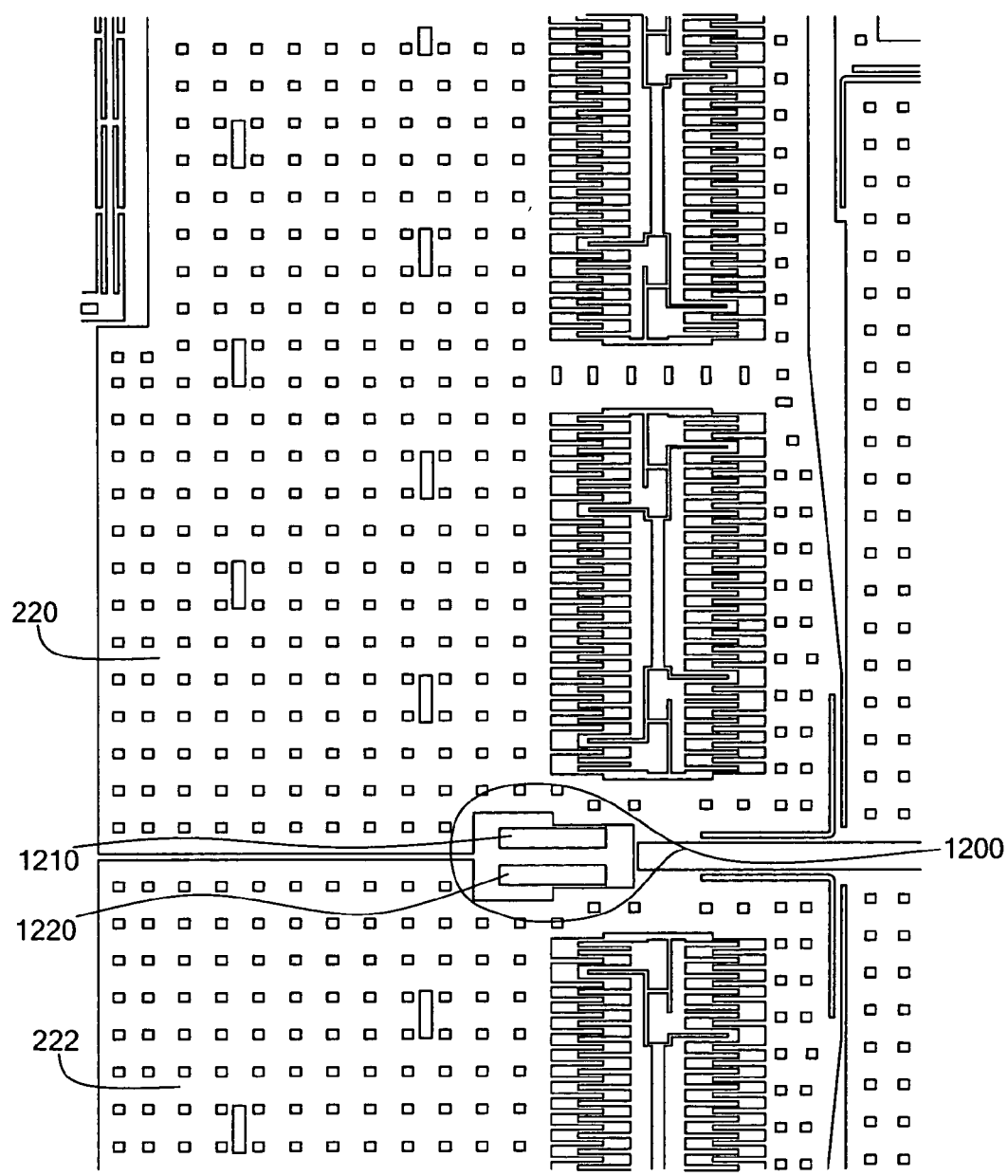
FIG. 12 shows a detailed view of quadrature suppression structures in accordance with an embodiment of the present invention.

Another way to vary the lateral force applied to the mass by the electrode is to vary the amount of the mass that is adjacent to the electrode based upon the position of the mass. FIG. 12 shows a detailed view of a quadrature suppression structure 1200 in accordance with an embodiment of the present invention. Two electrodes 1210 and 1220 are placed between two adjacent masses 220 and 222, specifically in a cavity formed in and by the two masses 220 and 222. The electrode 1210 is adjacent to the mass 220, and is capable of applying a lateral force on the mass 220 in the downward direction. The electrode 1220 is adjacent to the mass 222, and is capable of applying a lateral force on the mass 222 in the upward direction. In order to vary the amount of lateral force applied by an electrode, a notch is formed in each mass. The notch is formed adjacent to a portion of the electrode toward the end of the electrode closer to the frame. As the mass moves outward toward the frame, the length of mass that is directly adjacent to the electrode increases, resulting in a larger lateral force applied to the mass. As the mass moves inward away from the frame, the length of mass that is directly adjacent to the electrode decreases, resulting in a smaller lateral force applied to the mass.

In a typical embodiment of the present invention, a voltage is applied to one but not both of the electrodes 1210 and 1220. The electrode to which a voltage is applied is typically selected by characterizing the quadrature and determining the electrode (if any) that most decreases the quadrature.

It should be noted that a similar quadrature suppression structure is formed between the masses 224 and 226. In order to cancel out static forces, it is common to activate one electrode between the masses 220 and 222 and one electrode between the masses 224 and 226.

It should be noted that the position of the quadrature suppression electrodes is not limited to a cavity at the juncture between two masses. The electrodes can be placed in other positions. The positions of the various electrodes should be balanced. The electrodes generally produce a certain amount of torque on the mass, and the amount of torque depends at least to some degree on the position of the electrode. A small amount of torque is generally not a problem.

In a typical embodiment of the invention, a constant voltage is applied to the electrode. This generally produces good results. Alternatively, the voltage applied to the electrode can be varied. When done properly, this can result in improved quadrature suppression, but at the cost of increased complexity.

Although FIGS. 1 and 2 show the accelerometer suspension flexures 202, 204, 206, and 208 positioned at the four corners of the frame, it should be noted that the present invention is not limited to such positioning of accelerometer suspension flexures. Rather, accelerometer suspension flexures can be positioned at various points along the frame. The accelerometer suspension flexures preferably restrict translational movement of the frame while allowing rotational movement of the frame about the center of mass. This can be accomplished by positioning the accelerometer suspension flexures such that the linear axis between each pair of opposing accelerometer suspension flexures passes through the gyroscope's effective center of mass.

Various aspects of the present invention are described in greater detail in attachment pages A-1 through A-9 of the provisional applications incorporated by reference above.

Figure 13:
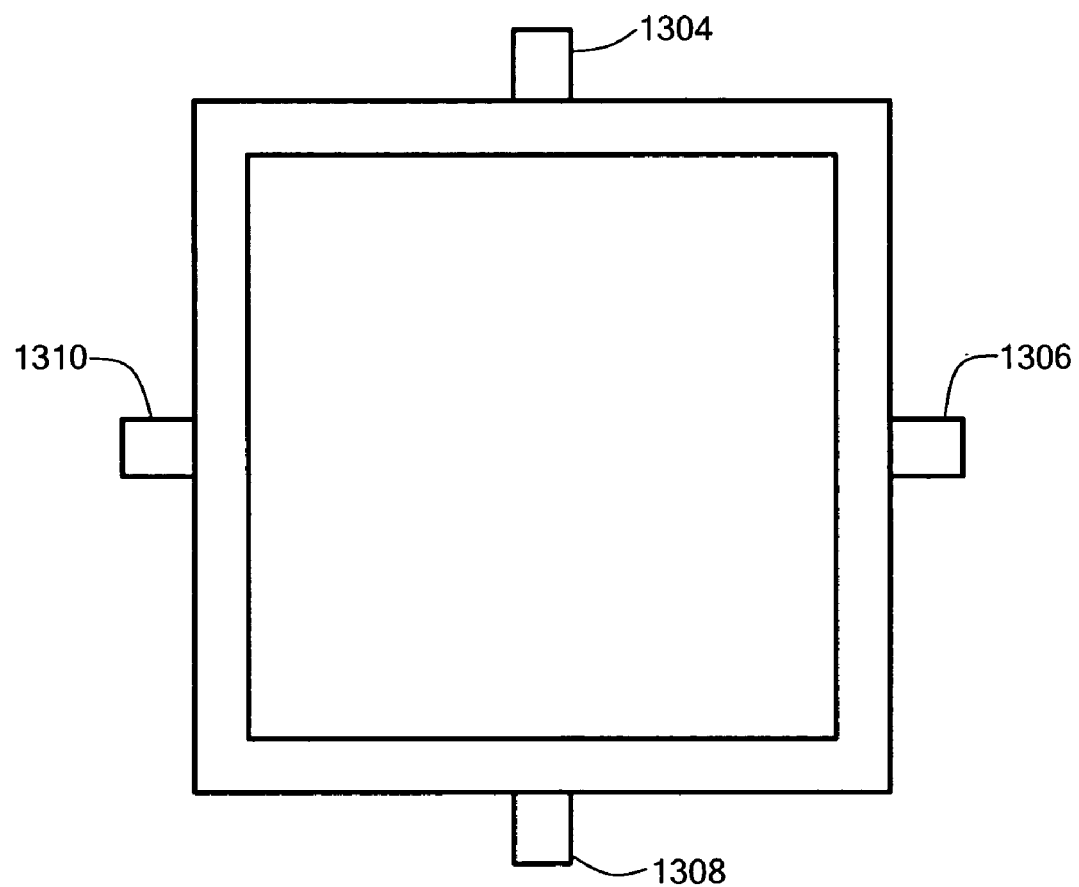
FIG. 13 shows an alternate frame suspension configuration in accordance with an embodiment of the present invention.

In an alternate embodiment of the present invention, the accelerometer suspension flexures are placed at the middle of the four sides of the frame rather than at the four corners of the frame. FIG. 13 shows an alternate frame suspension configuration in accordance with an embodiment of the present invention. In this embodiment, four accelerometer suspension flexures 1304, 1306, 1308, and 1310 are placed at the middle of the four sides of the frame 1302. There are certain production advantages to such a placement of the accelerometer suspension flexures. Specifically, certain etching equipment produces etches based upon a rectilinear grid, so it is easier to produce features that are aligned with the grid (as the side-positioned flexures would be) compared to features that are set at an angle to the grid (as the corner-positioned flexures would be). The corner-positioned flexures are also not particularly space efficient.

The gyroscope is typically produced by depositing an oxide layer (approximately 2 um thick) on top of a substrate (approximately 600 um thick), using photolithography on the oxide layer to produce holes at desired locations (and particularly at locations where the micromachined gyroscope structure 100 is to be coupled to the substrate), depositing a polysilicon layer (approximately 4 um thick) over the oxide layer which forms a thin film that bonds to the substrate through the holes in the oxide, using photolithography on the polysilicon layer to produce the complex structures of the micromachined gyroscope structure 100, and removing the oxide layer using hydrofluoric acid. Thus, the resulting micromachined gryoscope structure 100 is suspended approximately 2 um above the substrate. It should be noted from the various drawings that the micromachined gyroscope structure 100 has a large number of holes, particularly in the masses 220, 222, 224, and 226, the levers 228, 230, 232, and 234, and the frame 210. These holes are formed in the micromachined gyroscope structure 100 in order to allow the hydrofluoric acid to flow sufficiently through to the oxide layer. If such a micromachined gyroscope structure 100 was placed in a vacuum, the micromachined gyroscope structure 100 would typically be extremely fragile and would typically have a high resonance frequency that tends to ring. By operating the micromachined gyroscope structure 100 in air, the air cushions the micromachined gyroscope structure 100 and reduces ringing.

It should be noted that a micromachined gyroscope of the present invention typically operates in air rather than a vacuum. Operation in air has a number of advantages and disadvantages. On one hand, air tends to impede the motion of moving components due to viscous damping resulting in smaller output signals, tends to give a phase shift that spoils synchronous rectification, and tends to cause noise due to the impact of air molecules (brownian motion) resulting in reduced signal-to-noise ratio. On the other hand, however, operation in air enables the micromachined gyroscope to be a thin film structure, provides air cushioning that makes the thin film structure rugged, and eliminates the need for hermetic sealing of the gyroscope package resulting in a lower overall cost of the final product.

The present invention may be embodied in other specific forms without departing from the true scope of the invention. The described embodiments are to be considered in all respects only as illustrative and not restrictive.

Thus, the present invention is in no way limited to such things as the shape and size of the frame, the shape and size of the resonating structures (including masses, levers, forks, flexures, and pivot flexures), the number of movable masses, the manner in which the resonating structures are mechanically coupled, the number of fingers used for detecting Coriolis accelerations, the manner in which the coriolis detectors are electrically coupled, the manner in which the resonating structures are driven, and the materials and manner in which the gyroscope is produced, among other things.

What is claimed is:

1. A micromachined sensor with quadrature suppression comprising:
    a quadrature suppression electrode; and
    a resonator mass positioned adjacent to the quadrature suppression electrode, the resonator mass capable of moving substantially parallel to the quadrature suppression electrode, the resonator mass including a notch formed adjacent to a portion of the quadrature suppression electrode such that a length of the resonator mass that is directly adjacent to the quadrature suppression electrode varies as the resonator mass moves relative to the quadrature suppression electrode, wherein the quadrature suppression electrode is capable of producing a lateral force on the resonator mass that varies based on the length of the resonator mass that is directly adjacent to the quadrature suppression electrode.

2. A micromachined sensor according to claim 1, wherein the lateral force is an electrostatic force.

3. A micromachined sensor according to claim 1, further comprising a constant voltage applied to the quadrature suppression electrode, wherein the lateral force is proportional to the length of the resonator mass that is directly adjacent to the quadrature suppression electrode.

4. A micromachined sensor according to claim 1, further comprising a varying voltage applied to the quadrature suppression electrode, wherein the lateral force varies as a function of the length of the resonator mass that is directly adjacent to the quadrature suppression electrode and the varying voltage.

5. A micromachined sensor according to claim 1, further comprising:
    at least one drive electrode for causing movement of the resonator mass substantially parallel to the quadrature suppression electrode.

6. A micromachined sensor with quadrature suppression comprising:
    a plurality of quadrature suppression electrodes; and
    a plurality of resonator masses, each resonator mass positioned adjacent to a respective one of the quadrature suppression electrodes and capable of moving substantially parallel to the resonator mass' respective quadrature suppression electrode, each resonator mass including a notch formed adjacent to a portion of the resonator mass' respective quadrature suppression electrode such that a length of the resonator mass that is directly adjacent to the quadrature suppression electrode varies as the resonator mass moves relative to the quadrature suppression electrode, wherein each quadrature suppression electrode is capable of producing a lateral force on the adjacent resonator mass that varies based on the length of the resonator mass that is directly adjacent to the quadrature suppression electrode.

7. A micromachined sensor according to claim 6, further comprising a voltage applied to at least one of the plurality of quadrature suppression electrodes determined to reduce quadrature of the resonator masses.

8. A micromachined sensor according to claim 6, wherein the resonator masses are mechanically coupled through a plurality of levers, pivots, and flexures so as to produce substantially a single resonance frequency for the plurality of resonator masses.

9. A micromachined sensor according to claim 8, wherein the plurality of resonator masses includes:
    a first pair of masses mechanically coupled through a flexure; and
    a second pair of masses mechanically coupled through a flexure, wherein the first pair of masses and the second pair of masses resonate in anti-phase to one another.

10. A micromachined sensor according to claim 6, wherein the plurality of resonator masses are electrically coupled through common drive and velocity sensing circuits such as to resonate at substantially a single frequency.

11. A micromachined sensor with quadrature suppression comprising:
    a substrate;
    a frame suspended above and substantially parallel to the substrate by a first plurality of suspension flexures disposed along an outer perimeter of the frame, the first plurality of suspension flexures affixed to the substrate and formed so as to substantially prevent translational movement of the frame relative to the substrate within a plane of the frame and to permit rotational movement of the frame about an axis perpendicular to the frame and the substrate;

a plurality of quadrature suppression electrodes; and a plurality of resonator structures disposed within an inner perimeter of the frame, the resonator structures operating substantially within the plane of the frame, the resonator structures including a plurality of resonator masses, each resonator mass positioned adjacent to a respective one of the quadrature suppression electrodes and capable of moving substantially parallel to the resonator mass' respective quadrature suppression electrode, each resonator mass including a notch formed adjacent to a portion of the resonator mass' respective quadrature suppression electrode such that a length of resonator mass that is directly adjacent to the quadrature suppression electrode varies as the resonator mass moves relative to the quadrature suppression electrode, wherein each quadrature suppression electrode is capable of producing a lateral force on the adjacent resonator mass that varies based on the length of the resonator mass that is directly adjacent to the quadrature suppression electrode.

12. A micromachined sensor according to claim 11, wherein the plurality of resonator structures is suspended solely from the inner perimeter of the frame.

13. A micromachined sensor according to claim 11, wherein the resonator masses are mechanically coupled through a plurality of levers, pivots, and flexures so as to produce substantially a single resonance frequency for the plurality of resonator masses.

14. A micromachined sensor according to claim 13, wherein the plurality of resonator masses includes:

a first pair of masses mechanically coupled through a flexure; and a second pair of masses mechanically coupled through a flexure, wherein the first pair of masses and the second pair of masses resonate in anti-phase to one another.

15. A micromachined sensor according to claim 13, wherein each of the levers includes a plurality of lever fingers interdigitated with corresponding fixed fingers affixed to the substrate for at least one of driving the lever and sensing position of the lever.

16. A micromachined sensor according to claim 15, wherein each of the levers moves with an arcuate motion, and wherein the lever fingers are disposed at varying angles so as to maintain substantially equal distances from said corresponding fixed fingers during movement of the levers.

17. A micromachined sensor according to claim 11, further comprising:

a plurality of frame fingers disposed along the outer perimeter of the frame, the frame fingers interdigitated with corresponding sensing fingers affixed to the substrate for sensing said rotational movement of the frame.

18. A micromachined sensor according to claim 17, wherein the frame fingers are disposed at varying angles so as to maintain substantially equal distances from said corresponding sensing fingers during said rotational movement of the frame.

19. A micromachined sensor according to claim 11, wherein each resonator mass includes a first plurality of drive fingers interdigitated with a first corresponding array of fixed drive fingers affixed to the substrate and a second plurality of drive fingers interdigitated with a second corresponding array of fixed drive fingers affixed to the substrate, wherein the first and second arrays of fixed drive fingers operate in anti-phase to one another.

20. A micromachined sensor according to claim 19, wherein each array of fixed drive fingers is affixed to the substrate using a plurality of anchors, and wherein the anchors for the first and second arrays of fixed drive fingers are arranged to be co-linear in a lateral direction relative to the motion of the resonator mass.

21. A micromachined sensor according to claim 11, wherein the outer perimeter of the frame is substantially square and includes a plurality of frame fingers disposed along each side of the frame, the frame fingers interdigitated with corresponding sensing fingers affixed to the substrate for sensing said rotational movement of the frame that is induced by Coriolis acceleration when the resonator structures are resonating and the sensor is rotated about the axis.

22. A micromachined sensor according to claim 11, wherein the plurality of resonator masses are electrically coupled through common drive and velocity sensing circuits such as to resonate at substantially a single frequency.

* * * * *